United States Patent
Burov et al.

(10) Patent No.: US 7,440,166 B2
(45) Date of Patent: Oct. 21, 2008

(54) RAMAN DIFFUSION OPTICAL AMPLIFIER

(75) Inventors: Ekaterina Burov, Boulogne-Billancourt (FR); Christine Moreau, Palaiseau (FR); Florence Leplingard, Jouy-En-Josas (FR); Laurence Lorcy, St Fargeau Ponthierry (FR); Laurent Bigot, Hellemmes (FR)

(73) Assignee: ALCATEL, Paris (FR)

( * ) Notice: Subject to any disclaimer, the term of this patent is extended or adjusted under 35 U.S.C. 154(b) by 0 days.

(21) Appl. No.: 11/359,568

(22) Filed: Feb. 23, 2006

(65) Prior Publication Data

US 2006/0232850 A1    Oct. 19, 2006

(30) Foreign Application Priority Data

Feb. 24, 2005  (FR) .................................. 05 50509

(51) Int. Cl.
*H01S 4/00* (2006.01)
*H01S 3/00* (2006.01)
*H04B 10/12* (2006.01)

(52) U.S. Cl. ....................... 359/334; 977/773; 977/774; 977/834

(58) Field of Classification Search ................. 359/334; 977/773, 774, 8
See application file for complete search history.

(56) References Cited

U.S. PATENT DOCUMENTS

| | | | | | |
|---|---|---|---|---|---|
| 3,705,992 | A | * | 12/1972 | Lippen et al. | 359/327 |
| 4,618,783 | A | * | 10/1986 | Pradere et al. | 359/327 |
| 6,496,634 | B1 | * | 12/2002 | Levenson | 385/125 |
| 6,707,549 | B2 | * | 3/2004 | Tominaga et al. | 356/301 |
| 2006/0033983 | A1 | * | 2/2006 | Dai et al. | 359/334 |

FOREIGN PATENT DOCUMENTS

EP    1 455 425 A1    9/2004

OTHER PUBLICATIONS

Stuart D. Jackson, "Raman oscillation with intracavity pumping of a fibre laser", Optics Communications, North-Holland Publishing Co., Amsterdam, Netherlands, vol. 190, No. 1-6, Apr. 1, 2001, pp. 285-289, XP004233782.

* cited by examiner

*Primary Examiner*—Eric Bolda
(74) *Attorney, Agent, or Firm*—Sughrue Mion, PLLC

(57) ABSTRACT

An amplifier or laser using the stimulated Raman diffusion effect comprises a light guide (6), and a light pump (10) for producing a pump wave. In order to increase amplification efficiency, the light guide comprises a core structure that includes at least one optically active component that presents an electron transition energy corresponding to a wavelength that is close to the wavelength of the pump wave while nevertheless not being identical thereto. The invention is applicable to optical transmission systems.

8 Claims, 3 Drawing Sheets

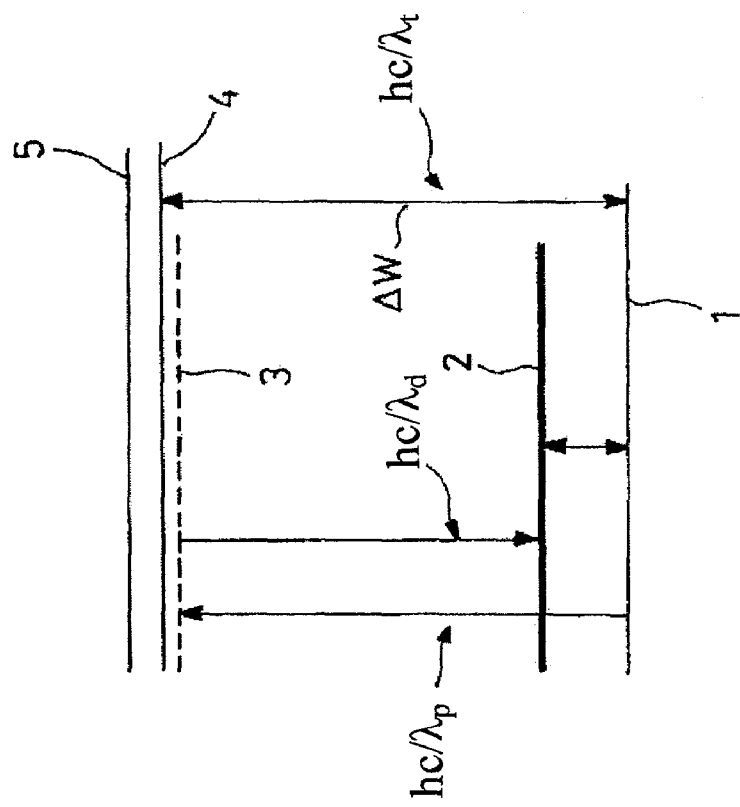
FIG_2
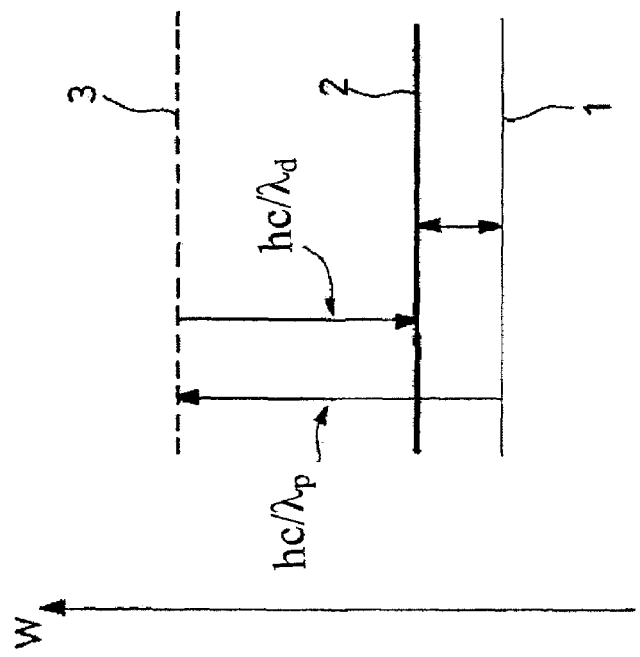
FIG_1

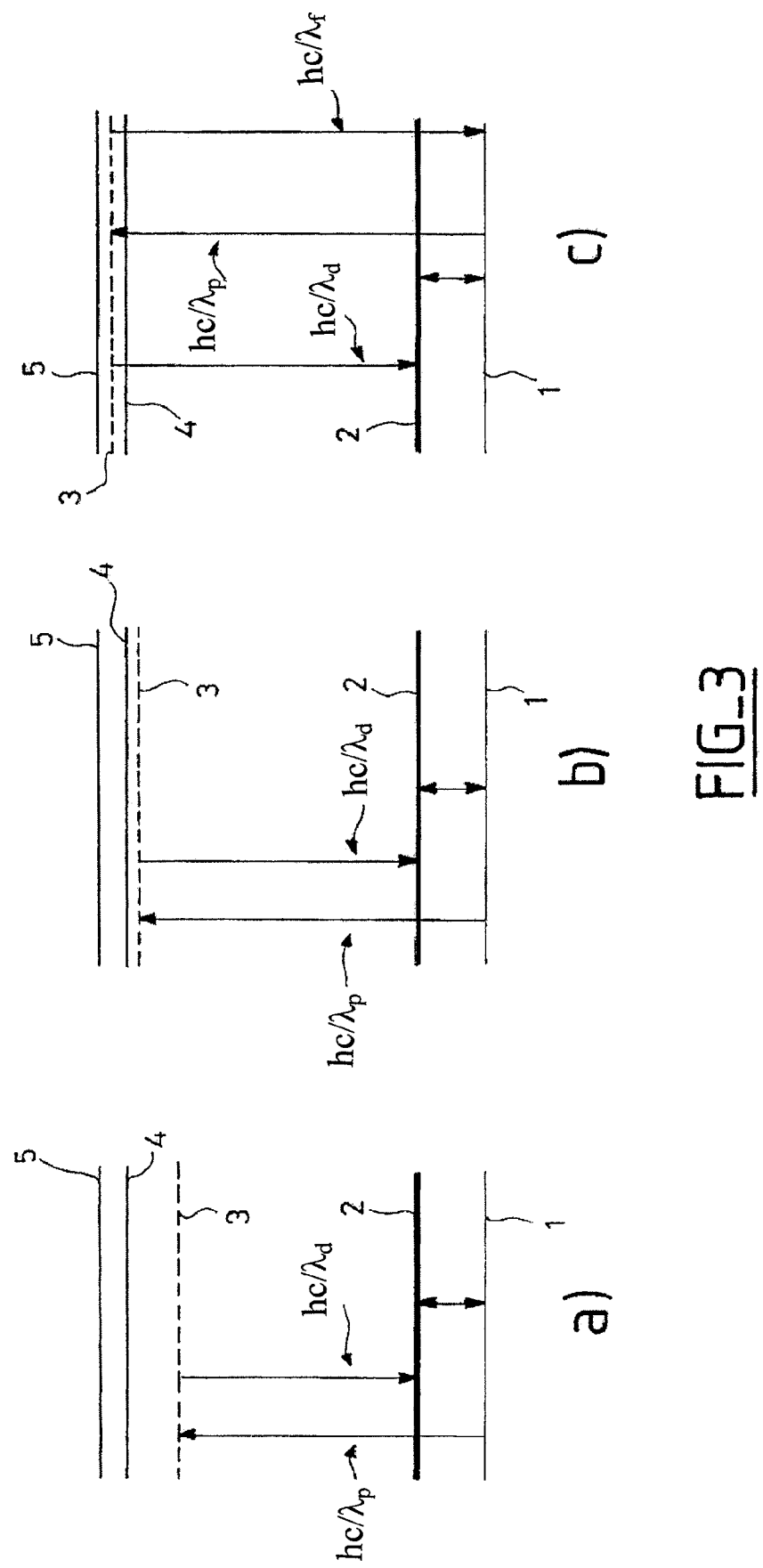
FIG_3

FIG_4
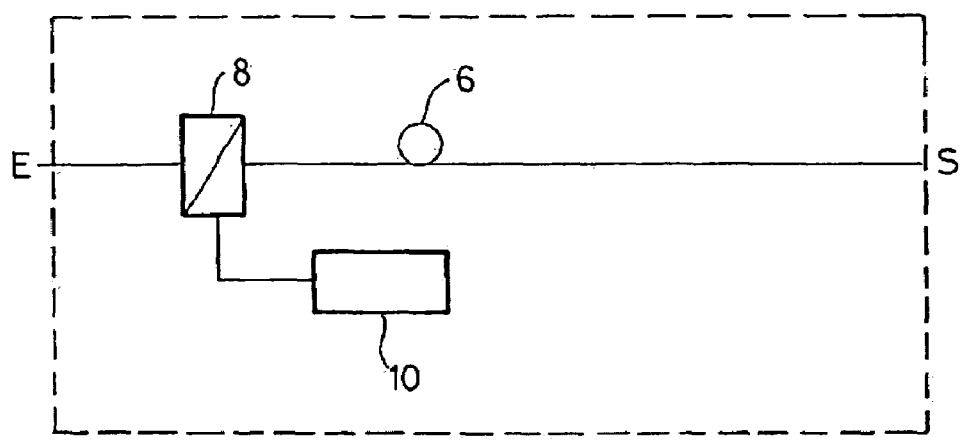
FIG_5
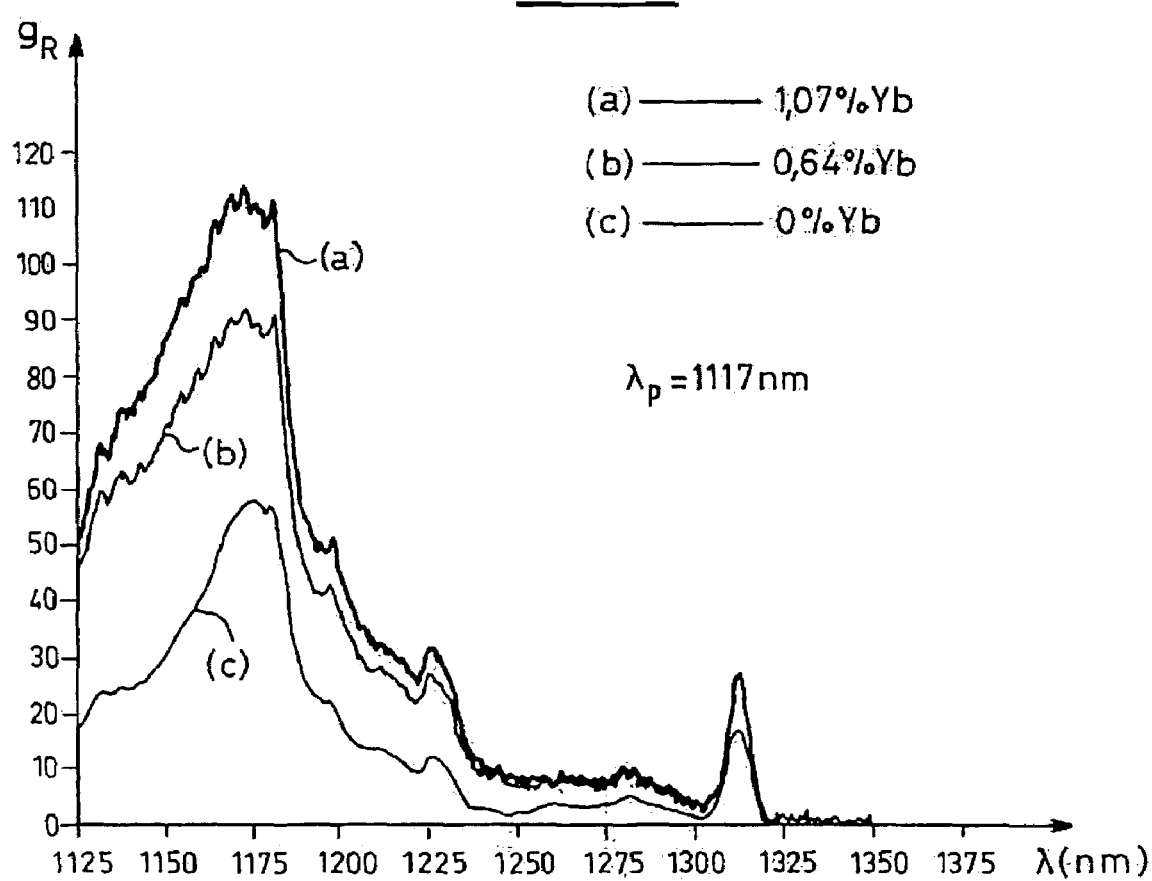
(a) ——— 1,07%Yb
(b) ——— 0,64%Yb
(c) ——— 0%Yb
$\lambda_p = 1117\,nm$

RAMAN DIFFUSION OPTICAL AMPLIFIER

BACKGROUND OF THE INVENTION

The present invention relates to Raman effect optical amplifiers used in particular in telecommunications optical systems.

Raman amplifiers have properties that are advantageous for wavelength division multiplex (WDM) optical transmission systems because they present a wide passband, low noise, and low sensitivity to variations in signal input power.

Nevertheless, in order to obtain effective amplification, it is necessary to use a high power light pump and an optical fiber of considerable length, thereby making Raman amplifiers expensive.

Raman amplification conventionally uses non-resonant stimulated Raman diffusion. In amplification of that type, and as shown by the FIG. 1 diagram of energy W, a pump wave photon at a wavelength $\lambda p$ loses its energy to create another photon of smaller energy and thus longer wavelength $\lambda d$ at a lower frequency (inelastic diffusion). The remainder of the energy of the incident photon is absorbed by the propagation medium (optical fiber) in the form of molecular vibration (phonon) represented by the vertical arrow between a solid first horizontal line 1 symbolizing a reference energy level corresponding to a fundamental vibration state and a thick solid second horizontal line 2 symbolizing a band of energy levels corresponding to excited vibration states. In order to increase amplification effectiveness, it is known to reduce the effective section area of the optical fiber so as to increase confinement, and/or to dope the core of the fiber strongly with a material having a high Raman coefficient, such as germanium in the form of an oxide forming part of the matrix constituting the core. Although core doping increases the effectiveness of the amplification, it nevertheless has the corollary of increasing losses.

To explain that conventional type of Raman amplification, the above description relates to a virtual electron energy level represented in the figure by a dashed horizontal line 3 for showing the transfer of energy from the pump wave at $\lambda p$ to the signal for amplification at $\lambda d$. This level is "virtual" since it does not correspond to any stable energy state of atoms constituting the core, including any possible dopants. This description of the Raman process in terms of a "virtual" level is thus justified by the fact that the interaction between the photons and the molecules, and the re-emissions of photons take place quasi-instantaneously.

SUMMARY OF THE INVENTION

An object of the invention is to make Raman amplification possible that is more effective than amplification by conventional stimulated Raman diffusion.

This object is achieved by an amplifier using the stimulated Raman diffusion effect, the amplifier comprising a light guide associated with a light pump for producing a pump wave, the amplifier being characterized in that said light guide comprises a core structure including at least one optically active component presenting an electron energy transition corresponding to a transition wavelength that is close to the wavelength of the pump wave but without being identical thereto.

The term "core structure" is used herein to mean regions of the waveguide where the majority of the light power of the wave propagation in the waveguide is concentrated. For example, when the waveguide is a simple optical fiber, the core structure amounts to the central zone of the fiber corresponding to the region having a refractive index that is greater than that of the or each peripheral zone of the fiber (conventionally referred to as the cladding). However the invention is also applicable to waveguides having core structures that are more complex, such as fibers having multiple concentric cores and cladding.

Depending on the embodiment, various components can be envisaged, the essential point being that the selected component is optically active, i.e. presents a transition wavelength adapted to the wavelength to be amplified, with account being taken of the material used for constituting the matrix of the waveguide core and the available wavelength that can be selected for the pump wave.

Thus, if a certain wavelength $\lambda p$ is imposed for the pump wave, then a component should be selected with which there exists an electron energy transition $\Delta W$ of a value such that the wavelength $\lambda t$ corresponding to said value (i.e. such that $\Delta W = h.c/\lambda t$ in the usual formula relating electron energy transition $\Delta W$ to wavelengths $\lambda$), is close to $\lambda p$ but without being exactly equal thereto. The difference needs to be sufficient to avoid resonant fluorescence of the dopant being produced, since that could be much more powerful than the Raman effect and could mask it.

The precise offset to be applied between these two wavelengths can be determined for any particular context in experimental manner. A simple way of doing this consists in measuring the Raman gain coefficient of the amplifier while varying the wavelength of the pump wave. It can be said that the amplifier is placed in the condition of operating in accordance with the invention once the wavelengths of the pump wave and of the transition differ by a value that is adjusted so that the amplifier presents a Raman gain coefficient that is equal to at least twice the value that said gain coefficient would take in the absence of the optically active component.

In another aspect of the invention, a pump wave wavelength is preferably chosen to be greater than the transition wavelength. This disposition is generally preferable since otherwise signal losses can be increased by energy being absorbed by the active element at the signal wavelength.

Advantageously, the optically active component is selected from the following elements: rare earth ions; transition metals; and semiconductor materials.

This component is dispersed in the core structure of the light guide, where dispersion can be located throughout the structure or in a portion only thereof. Depending on the type of component, it should be dispersed either in elemental form or in nanoparticle form.

The light guide of the amplifier may be constituted in particular by a planar waveguide or by an optical fiber.

The invention also provides a laser made using an optical amplifier in accordance with the above description.

BRIEF DESCRIPTION OF THE DRAWINGS

The invention can be better understood on reading the following description and on examining the accompanying figures. In these figures, which are given by way of indication only and which do not limit the invention:

FIG. 1 is an energy diagram showing the prior art principle of amplification by stimulated Raman diffusion, and is described above;

FIG. 2 is an energy diagram showing the principle of the invention for amplification by Raman diffusion;

FIG. 3 comprises three energy diagrams a), b), and c) showing how pumping should be selected to obtain the Raman diffusion of the invention;

FIG. 4 shows a Raman amplifier; and

FIG. 5 is a graph showing the effect of using an optically active material of the invention on the gain of a Raman amplifier.

DETAILED DESCRIPTION OF THE INVENTION

As can be seen in the energy diagram of FIG. 2, the invention differs from the prior art in that the amplification uses an electron energy transition that implies a real intermediate electron energy level 4. Another energy level 5 that is higher is also shown. This has the effect of considerably increasing the effectiveness of Raman diffusion.

More precisely, an optically active material is selected that presents a transition between two energy levels that corresponds to a transition wavelength λt close to the pump wavelength λp. The term "close" means that the difference between the pump wavelength and the electron transition wavelength must be large enough to prevent the pump signal being absorbed by the electron transition, while nevertheless not being excessive to such an extent that energy cannot be transferred from the pump photon to said real electron level.

The three energy diagrams of FIG. 3 serve to show that the choice of pumping as a function of the selected optically active material is important in order to obtain the desired result.

Diagram a) corresponds to the pump wavelength λp being too long relative to the transition wavelength λt to allow interactions with the optically active material. This is thus the situation of conventional Raman amplification, as shown in FIG. 1.

Diagram b) corresponds to the case where the pump wavelength λp is optimum, i.e. close enough to the transition wavelength λt.

Diagram c) corresponds to another case where the pump wavelength λp is too close to the transition wavelength λt. This situation leads to fluorescence as represented by λf.

In particular, for applications in the field of telecommunications, it is advantageously possible to use an energy transition which corresponds to a pump wavelength lying in the range 400 nanometers (nm) to 2066 nm. Typically, if the wavelength of the pump wave and the transition wavelength correspond to wave numbers per centimeter ($cm^{-1}$) which differ by a few hundred, then a Raman gain coefficient is observed lying in the range 2 to 10 times the value that this coefficient takes with an amplifier of the same structure and placed under the same pumping conditions, but not having an optically active component in accordance with the invention.

Advantageously, a pump wavelength is selected that is longer than the transition wavelength so as to avoid producing resonant fluorescence of the optically active material which might be much more powerful than the Raman effect and might mask it. As shown in FIG. c), fluorescence at λf can be envisaged by a transition from the higher energy level 5.

It should be observed that the improvement in amplification compared with the prior art is due to the proximity of the pump wavelength and the transition wavelength, and that unlike conventional stimulated Raman diffusion, gain does not depend on the composition of the matrix constituting the propagation medium, but on the type and the quantity of the active component used.

Amongst optically active materials that are suitable, mention can be made in particular of rare earth ions, semiconductor materials, and metallic ions.

As with conventional Raman amplification, the pump wavelength is selected as a function of the desired amplification band and of the vibratory bands for the propagation medium.

Examples of optically active materials and of the corresponding emission bands that can be used for the pump signal are given below as examples:

| Optically active materials | Pump signal emission band (nm) |
| --- | --- |
| Ge nanoparticles | 500-1900 |
| Si nanoparticles | 300-800 |
| $Yb^{3+}$ | 1000-1200 |
| PbS nanoparticles | 1200-2000 |
| $Tm^{3+}$ | 1400-1500 |
| $Er^{3+}$ | 1650-1750 |

The advantage of nanoparticles, in particular semiconductor particles is the ability to tune the electron transition wavelength by controlling nanoparticle size.

Practical embodiments of an amplifier in accordance with the invention can rely on conventional methods commonly used in fabricating doped planar waveguides or fibers.

The invention can naturally be applied to any waveguide structure. The optically active component may also constitute a layer of the core structure of the waveguide. This structure is then annular if the waveguide is an optical fiber or planar if the waveguide is planar.

For embodiments using nanoparticles, reference can be made for example to European patent application EP-A-1 347 545 published on Sep. 24, 2003,and the corresponding US patent application US-A-2003/0175003 published on Sep. 18, 2003.

The general structure of an amplifier of the invention is shown in FIG. 4. The amplifier comprises in a conventional general layout a waveguide which in the embodiment shown comprises an optical fiber 6 adapted to Raman amplification, a pump 10, and a coupler 8 for injecting the wave delivered by the pump into the optical fiber 6, together with a signal that is to be amplified as received on a inlet E. An outlet S from the fiber constitutes the outlet from the amplifier.

The efficiency of Raman diffusion amplification in accordance with the invention is considerably improved compared with conventional amplification by stimulated Raman diffusion. Thus, for given amplification, compared with the prior art it is possible to reduce the power of the pump and/or the length of the propagation medium.

FIG. 5 plots three curves showing variation in the Raman gain coefficient $g_R$ (so-called "intrinsic Raman gain") as a function of wavelength for a pump wavelength of 1117 nm and relating respectively to three amplifiers each using a fiber having the same conventional structure but in which the core presents different characteristics of active element doping:

curve a): Yb doping at a concentration by weight of 1.07%;

curve b): Yb doping at a concentration by weight of 0.64%; and curve c): no Yb doping.

As can be seen in FIG. 5, gain doubling can be obtained by doping the propagation medium with $Yb^{3+}$ ions at a concentration by weight of about 1%.

Naturally, it is possible to associate a plurality of types of optically active component having different properties, in particular for the purpose of enlarging the gain band of the amplifier.

To make an oscillator or a laser source by means of an amplifier according to the invention, it suffices to place the amplifier within a resonant cavity, e.g. by providing a suitable reflector at each end of the amplifier, where this can be done in conventional manner, e.g. using a Bragg reflector. It should be observed that the oscillation wavelength(s) of the laser will be a function of the pump and of the components (particles, ions, etc.) used.

What is claimed is:

1. An amplifier using the stimulated Raman diffusion effect, the amplifier comprising:
    a light guide associated with a light pump for producing a pump wave,
    wherein said light guide comprises a core structure including at least one optically active component presenting an electron energy transition corresponding to a transition wavelength ($\lambda t$) that is close to the wavelength ($\lambda p$) of the pump wave but without being identical thereto,
    wherein the at least one optically active component is dispersed in said core structure,
    wherein said dispersion of the optically active component is located throughout the structure or in a portion only thereof, and
    wherein the optically active component is dispersed in nanoparticle form.

2. An amplifier according to claim 1, wherein said pump wave wavelength ($\lambda p$) and said transition wavelength ($\lambda t$) differ by a value that is adjusted so that the amplifier presents a Raman gain coefficient ($g_R$) that is at least twice the value that said gain coefficient would have in the absence of the optically active component.

3. An amplifier according to claim 1, wherein the pump wave wavelength ($\lambda p$) and the transition wavelength ($\lambda t$) correspond to wave numbers expressed in $cm^{-1}$ that differ by a few hundred.

4. An amplifier according to claim 1, wherein the pump wave wavelength ($\lambda p$) is greater than the transition wavelength ($\lambda t$).

5. An amplifier according to claim 1, wherein the optically active component is selected from the following elements: rare earth ions; transition metals; and semiconductor materials.

6. An amplifier according to claim 1, wherein the optically active component constitutes a layer of said light guide core structure.

7. An amplifier according to claim 1, wherein the light guide (6) is selected from the group comprising planar waveguides and optical fibers.

8. A laser source comprising an optical amplifier disposed within a resonant cavity, wherein the amplifier is in accordance with claim 1.

* * * * *